United States Patent

Seidel-Peschmann et al.

[11] Patent Number: 6,119,728
[45] Date of Patent: Sep. 19, 2000

[54] ASSEMBLY FOR REDUCTION OF PULSATIONS AND VIBRATIONS IN A HOSE

[75] Inventors: Michael Seidel-Peschmann, Baden-Baden; Udo Popp, Bühl, both of Germany

[73] Assignee: Aeroquip Corporation, Maumee, Ohio

[21] Appl. No.: 09/274,860

[22] Filed: Mar. 23, 1999

[30] Foreign Application Priority Data

Apr. 1, 1998 [DE] Germany .......................... 198 14 649
Jul. 28, 1998 [DE] Germany .......................... 198 33 899

[51] Int. Cl.[7] ................................................. F16L 55/04
[52] U.S. Cl. .................................. 138/26; 138/39; 138/44
[58] Field of Search ................................. 138/26, 39, 44

[56] References Cited

U.S. PATENT DOCUMENTS

| | | | |
|---|---|---|---|
| 1,134,109 | 4/1915 | Daniels | 138/37 |
| 3,894,562 | 7/1975 | Moseley, Jr. et al. | 138/44 |
| 3,902,601 | 9/1975 | Townley | 138/39 |
| 4,054,157 | 10/1977 | Moseley, Jr. | 138/42 |
| 4,161,965 | 7/1979 | Merritt | 138/46 |
| 4,232,711 | 11/1980 | Ray, Sr. et al. | 138/46 |
| 4,285,534 | 8/1981 | Katayama et al. | 138/26 |
| 4,577,606 | 3/1986 | Bohringer et al. | 137/493.3 |
| 4,611,633 | 9/1986 | Buchholz et al. | 138/26 |
| 5,531,287 | 7/1996 | Sherman | 138/44 |
| 5,539,164 | 7/1996 | Van Ruiten | 138/30 |
| 5,632,242 | 5/1997 | Harde | 138/44 |
| 5,941,283 | 8/1999 | Forte | 138/30 |

*Primary Examiner*—James Hook
*Attorney, Agent, or Firm*—Emch, Schaffer, Schaub & Porcello, Co., L.P.A.

[57] ABSTRACT

An assembly for reduction of pulsations and vibrations in a hose including a hose having an interior surface and a throttle being sized for insertion in the hose adjacent to the interior surface. The throttle includes a fluid passageway. The throttle further includes a first end adjacent to the fluid passageway. The first end includes a regulation device for regulating the flow of fluid through the fluid passageway to reduce pulsations and vibrations in the hose.

7 Claims, 3 Drawing Sheets

ASSEMBLY FOR REDUCTION OF PULSATIONS AND VIBRATIONS IN A HOSE

BACKGROUND OF THE INVENTION

The invention relates to an assembly for the reduction of pulsations and vibrations in a hose. More specifically, the invention is directed to a pulsation and vibration reduction assembly for use in hydraulic hose-line systems, such as automotive hydraulic steering assistance systems.

It is known, in a hydraulic hose-line system that includes a feed pump, to transport pressurized fluid by one or more hoses. The feed pump generates pulsations and vibrations. Because the hoses are composed of elastomeric materials, expansion of the hoses takes place under pressure load. The pressure-dependent changes in volume which occur in this case lead to the damping of pulsations and vibrations and therefore to a reduction of undesirable noises. At low frequencies, the damping of a hose is often insufficient.

To avoid this disadvantage, it has already been proposed, in such a hydraulic hose-line system, to provide at least one non-return valve which is arranged in a high-pressure pipe between a hose and a fixed connection point, for example, a control valve. The non-return valve prevents pulsations and vibrations at low frequencies, for example, in a frequency range of between about 20 and 50 Hz.

It is also known to integrate the non-return valve into a hollow screw which serves for fastening a hose to a steering gear. Moreover, screwed pipe connections are known which are connected to the steering gear and into which the non-return valve is integrated.

Throttles are also employed to reduce the undesirable pulsations occurring in this type of hydraulic system.

A disadvantage of the known solutions is that the damping means cannot always be introduced in the best possible place for damping the pulsations and vibrations and therefore the noises. Moreover, installing these damping means entails relatively high costs.

The present invention provides an assembly for the reduction of pulsations and vibrations in hydraulic hose-line systems which is relatively simple and cost-effective as compared to prior art assemblies.

SUMMARY OF THE INVENTION

The present invention is directed to an assembly for reduction of pulsations and vibrations in a hose. The assembly includes a hose having an interior surface. The assembly further includes a throttle that is sized for insertion in the hose adjacent the interior surface. The throttle includes a fluid passageway. The throttle further includes a first end adjacent to the fluid passageway. The first end includes a regulation device for regulating the flow of fluid through the fluid passageway to reduce pulsations and vibrations in the hose.

The primary object of the present invention is to provide an assembly for the reduction of pulsations and vibrations in a hose.

Other objects and advantages of the present invention will become apparent to those skilled in the art upon a review of the following detailed description of the preferred embodiments and the accompanying drawings.

DETAILED DESCRIPTION OF THE PREFERRED EMBODIMENTS

Figure 1:
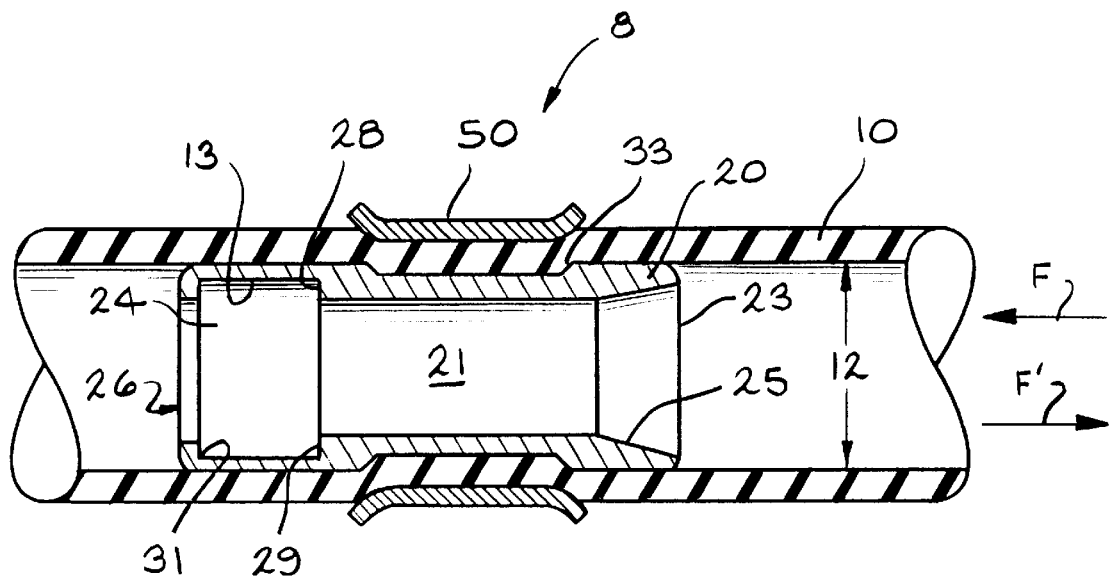
FIG. 1 is a cross-sectional view taken through the center of an assembly for reduction of pulsations and vibrations in a hose according to the present invention.

The preferred embodiments and best mode of the present invention will now be described in detail with reference to the exemplary embodiments illustrated in the drawings. The assembly of the present invention is indicated generally in the drawings by the reference number "8".

FIG. 1 illustrates a first embodiment assembly 8 having a portion of an elastomeric hose 10 of a hydraulic hose-line system. A throttle 20 is positioned in the hose 10. The throttle 20 has an outside diameter which corresponds to the inside diameter 12 of the hose 10. The throttle 20 has an internal elongate throttle region 21 which merges through a transitional region 25 into a first end region 23. The transitional region 25 produces a slow continuous transition from the interior of the hose 10 to the throttle region 21. The transitional region 25 includes a tapered surface to regulate the flow of a pressurized fluid flowing through the throttle region 21 to reduce pulsations and vibrations in the hose 10.

The second end region 24, located opposite the first end region 23 of the throttle 20, has a cylindrical recess 13. The second end region 24 possesses a circular receiving orifice 26 which has a diameter smaller than that of the diameter of the cylindrical recess 13. The cylindrical recess 13 forms part faces 28 and 29, which preferably form a continuous annular face, adjacent to the throttle region 21. The throttle 20 is preferably made of metal.

Still referring to FIG. 1, a non-return valve (not shown) can be pressed into the cylindrical recess 13 through the receiving orifice 26 adjacent to a bearing shoulder 31. One end of the non-return valve engages the part faces 28 and 29. Accordingly, the non-return valve 30 is fixedly secured between the part faces 28 and 29 and the bearing shoulder 31 surrounding the receiving orifice 26.

The throttle 20 is secured within the hose 10 by a securing clamp 50 which surrounds the hose 10 above of the throttle region 21. As shown in FIG. 1, the throttle 20 is provided, in its outer face, with a peripheral depression 33, into which the wall of the hose line 10 is pressed by the securing clamp 50. This results in the secure anchoring of the throttle 20 in the hose 10.

Figure 2:
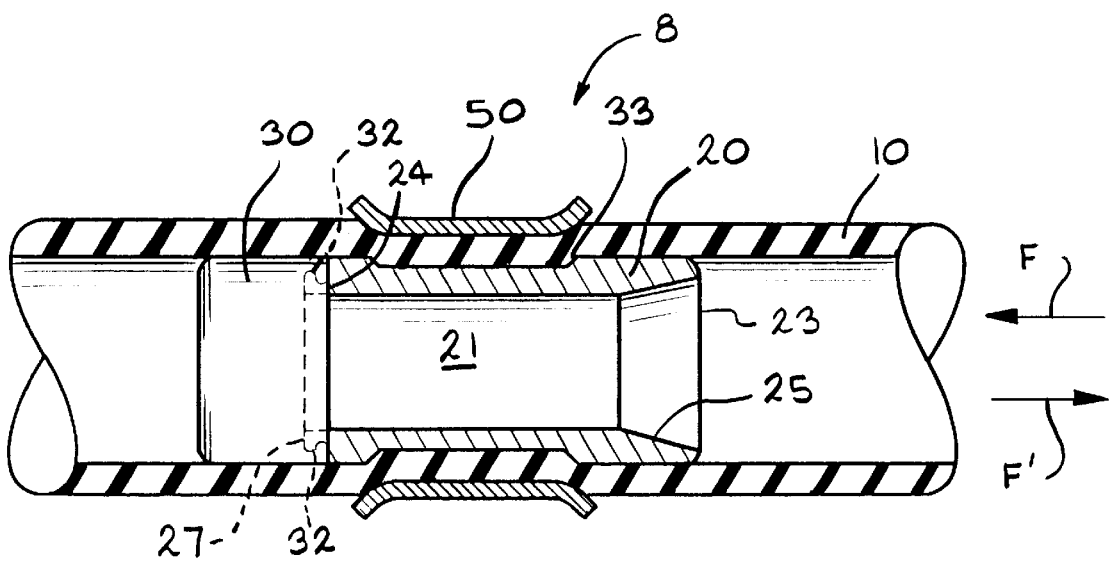
FIG. 2 is a cross-section view taken through a second embodiment of the present invention.

FIG. 2 illustrates a second embodiment assembly 8 of the present invention. Identical components are given the same reference symbols as used in FIG. 1 and described above. The embodiment shown in FIG. 2 differs from that shown in FIG. 1 only in the configuration of the throttle 20. The second end region 24 has a peripheral shoulder 27. The shoulder 27 has a smaller outside diameter than the inside diameter of the hose 10. A non-return valve 30 has a projection 32 which engages the peripheral shoulder 27 of the throttle 20 to attach the non-return valve 30 to the throttle 20.

Figure 3:
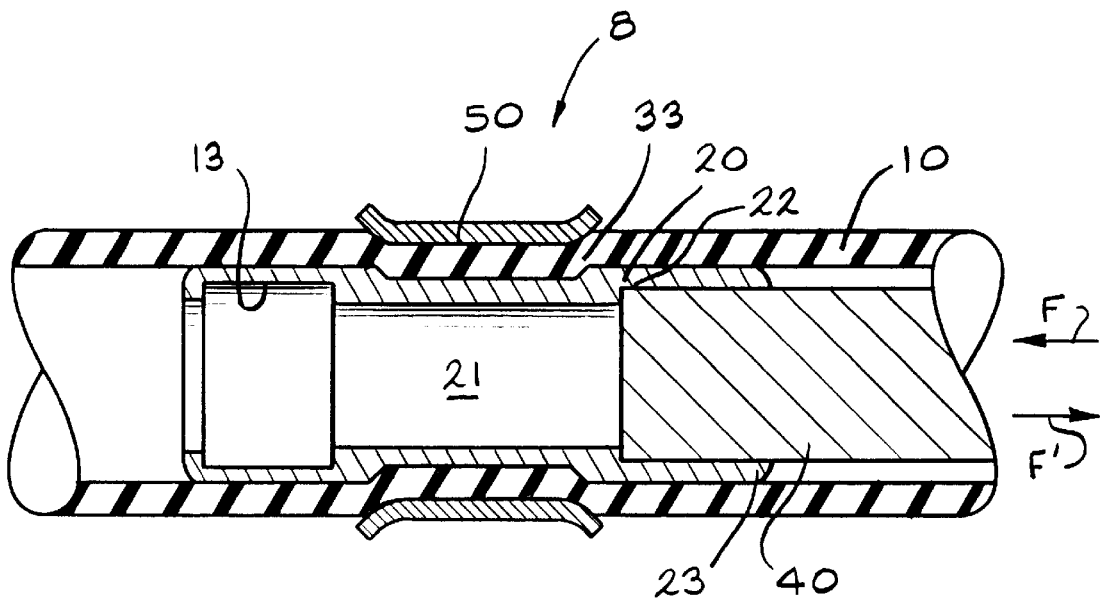
FIG. 3 is a view similar to FIG. 1 showing a metal tuner.
Figure 4:
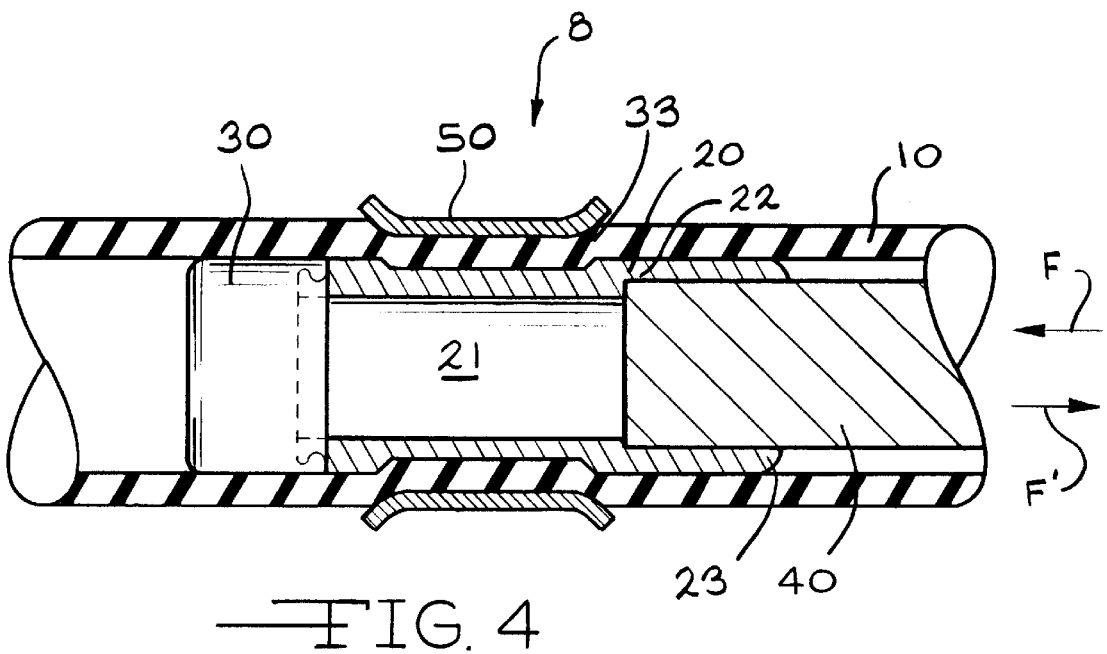
FIG. 4 is a view similar to FIG. 2 showing a metal tuner.

Further exemplary embodiments of the assembly 8 are shown in FIGS. 3 and 4. FIG. 3 corresponds to the embodiment shown in FIG. 1 and FIG. 4 corresponds to the embodiment shown in FIG. 2. As shown in FIG. 3 and 4, the first end region 23 of the throttle 20 is lengthened. This lengthened first end region 23, which is cylindrical, merges through a breakaway edge 22 into the throttle region 21. The transitional region 25, as shown in FIGS. 1 and 2, is absent in these embodiments.

Still referring to FIGS. 3 and 4, the first end region 23 receives a cylindrical tuner 40 or resonator. In a preferred embodiment, the tuner 40 consists of a hollow cylinder formed from a double spiral of metal as shown in FIGS. 3 and 4. The tuner 40 has a predetermined shape to regulate the flow of a pressurized fluid flowing through the throttle region 21 to reduce pulsations and vibrations in the hose 10.

Figure 5:
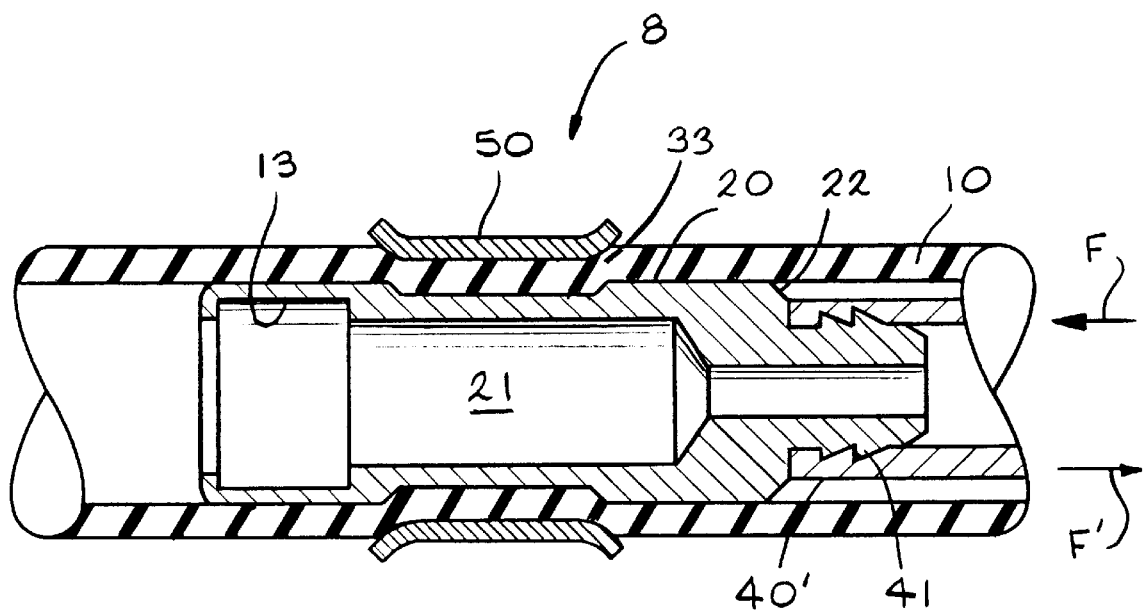
FIG. 5 is a view similar to FIG. 1 showing a plastic tuner.

FIG. 5 shows another embodiment of the present invention with a tuner 40'. The tuner 40' is a cylindrical pipe having a wall having a predetermined shape which is provided with perforations or holes (not shown). The tuner 40' regulates the flow of a pressurized fluid flowing through the throttle region 21 to reduce pulsations and vibrations in the hose 10. The tuner 40' is preferably constructed of plastic such as polytetrafluoroethylene (PTFE). As shown in FIG. 5, the tuner 40' is pushed onto a fastening nipple 41 which extends from the throttle 20 and which is preferably provided with barbs to secure the tuner 40' with the throttle 20.

Figure 6:
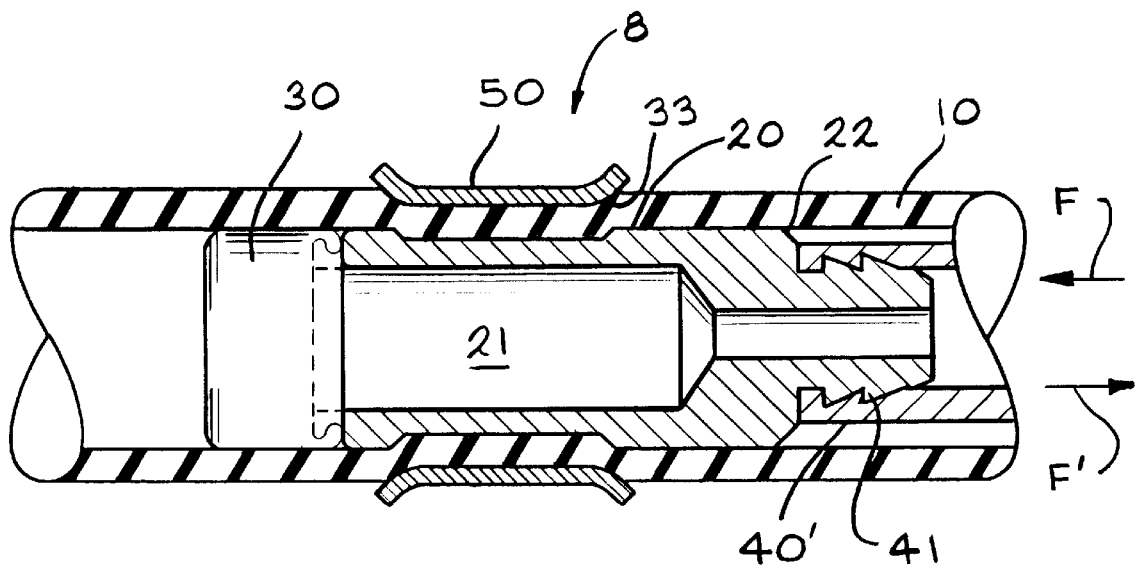
FIG. 6 is a view similar to FIG. 2 showing a plastic tuner.

FIG. 6 shows another embodiment of the present invention having a tuner 40' similar to the one shown in FIG. 5 and described above. As shown in FIG. 6, the non-return valve 30 is attached to the throttle 20 as described above with reference to the embodiment shown in FIG. 2.

In a complex hose-line system, it is advantageous to connect a plurality of assemblies 8 in series in order to dampen vibrations and pulsations as near as possible to their points of origin or in regions where there is particularly pronounced noise radiation. It is particularly advantageous, in this case, that the throttle and the other damping means may be provided at virtually any desired point along the hose line.

The mode of operation of the assembly 8 is described below with reference to FIGS. 1 to 6. In the drawings, the direction of fluid flow is indicated by the arrows F and F'.

The throttle 20 serves for damping pulsations and vibrations which occur in the hose 10. The non-return valve 30 is subjected to a definite prestress. This ensures that, when vibrations, oscillations and/or pulsations occur in the hose-line system, the non-return valve 30 closes automatically if there is a reversal of flow. When the oscillatory peak has diminished, the non-return valve 30 opens again and releases the throughflow in the direction of the arrows F and F'. It is important for the functioning of the non-return valve 30 to align the latter with the desired direction of flow F or F'.

In the exemplary embodiments shown in FIGS. 4 and 6, the tuner 40 precedes the throttle 20 and non-return valve 30. The tuner 40, by being designed as a double spiral or as a pipe with a perforated wall, influences the frequency of vibrations and pulsations in such a way that these can be damped particularly effectively by the throttle 20 or the non-return valve 30 in interaction with the tuner 40. Undesirable noises are consequently avoided, or at least reduced appreciably.

The use of a non-return valve 30, a throttle 20 and a tuner 40, of the type described with reference to FIGS. 1 to 6, does not result in additional connection parts or connection points within a hydraulic apparatus. There is therefore little risk that additional leakage possibilities will occur when the damping of pulsations and vibrations is accomplished as described above.

The assembly 8 of the present invention can be used in both high and low pressure applications of hydraulic systems to reduce vibrations and pulsations.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. An assembly for the reduction of pulsations and vibrations in a hose comprising:

a hose having an interior surface;

a throttle being sized for insertion in said hose adjacent to said interior surface, said throttle including a fluid passageway, said throttle further including a first end adjacent to said fluid passageway, said first end including regulation means for regulating the flow of fluid through said fluid passageway in a first direction to reduce pulsations and vibrations in said hose, said throttle further including a second end adjacent to said fluid passageway, said second end including a non-return valve having a definite prestress for regulating the flow of fluid through said fluid passageway in a second direction to reduce pulsations and vibrations in said hose; and a clamp for securing said throttle in said hose.

2. The assembly of claim 1, wherein said regulation means consists of a transitional region having a tapered surface.

3. The assembly of claim 1, wherein said regulation means consists of a tuner.

4. The assembly of claim 3, wherein said tuner is a hollow cylinder.

5. The assembly of claim 1, wherein said second end including attachment means for attaching said non-return valve to said throttle.

6. The assembly of claim 5, wherein said attachment means consists of a cylindrical recess having an annular face and an opposed bearing shoulder.

7. The assembly of claim 5, wherein said attachment means consists of a projection having a peripheral shoulder.

\* \* \* \* \*